J. W. SIMPSON.
Corn-Planters.

No. 152,307. Patented June 23, 1874.

WITNESSES.
Chas. Nida
Chdgwick

INVENTOR.
J. W. Simpson
BY

UNITED STATES PATENT OFFICE.

JAMES W. SIMPSON, OF DRY RIDGE, KENTUCKY.

IMPROVEMENT IN CORN-PLANTERS.

Specification forming part of Letters Patent No. 152,307, dated June 23, 1874; application filed February 28, 1874.

*To all whom it may concern:*

Figure 1:
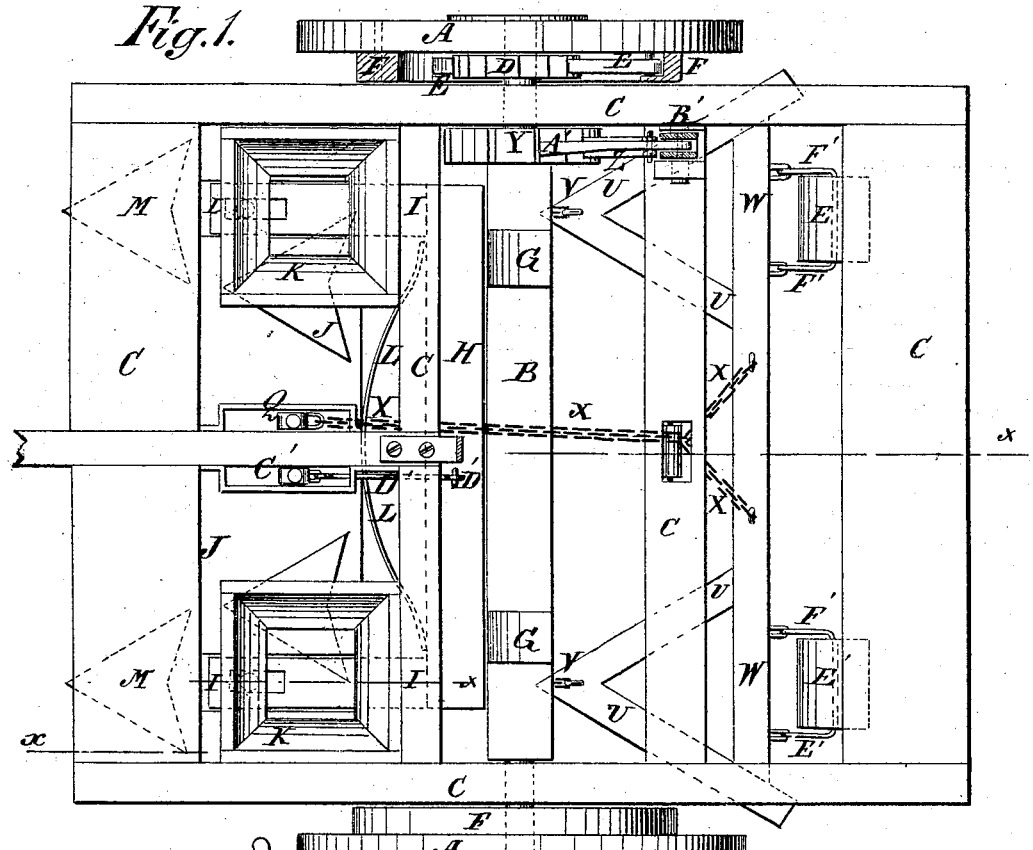
Figure 2:
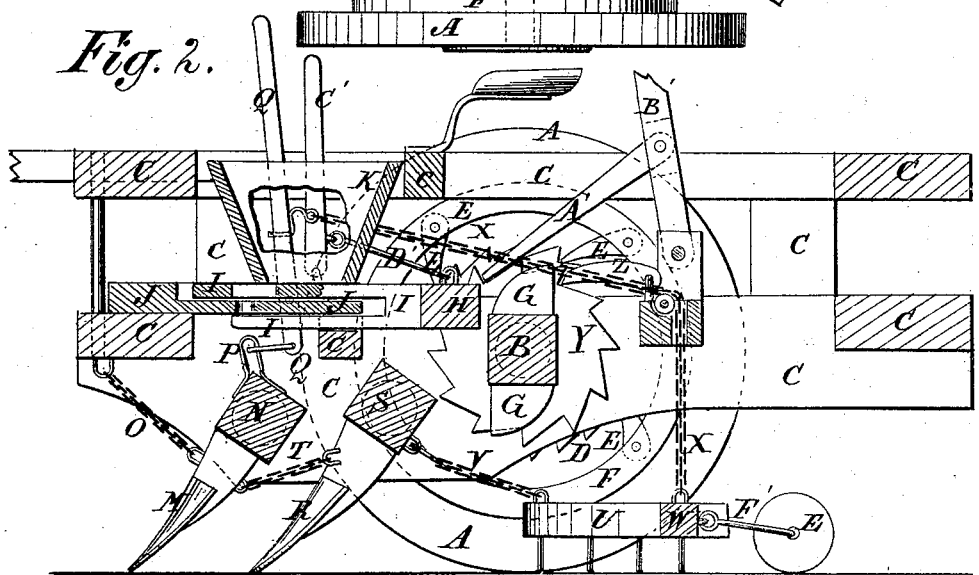

Be it known that I, JAMES WILLIAM SIMPSON, of Dry Ridge, in the county of Grant and State of Kentucky, have invented a new and useful Improvement in Corn-Planter, of which the following is a specification:

Figure 1 is a top view of my improved machine, the driver's seat being removed. Fig. 2 is a detail vertical section of the same, taken through the broken line *x x x*, Fig. 1.

Similar letters of reference indicate corresponding parts.

The invention will first be fully described, and then pointed out in the claims.

A are the wheels, which revolve upon the journals of the axle B, which revolves in bearings attached to the frame-work C of the machine. To the axle B, at the inner side of the wheels, are attached ratchet-wheels D, upon the teeth of which the pawls E take hold, to cause the said wheels to carry the said axle with them in their revolution when turning forward, and allow the axle to be stationary when the wheels are turned backward. The pawls E are pivoted to rings F, attached to the wheels A. The rings F also protect the pawls E, and prevent them from swinging into such a position that they will not drop again upon the teeth of the ratchet-wheels D, so many pawls E being pivoted to the said rings that one or more of them may always be in working position. To the opposite sides of the axle B, at a little distance from its end, are attached cams G, which, as the said axle B revolves, strike against the bar H, and push it forward. To the forward side of the bar H are attached two bars, I, which are slotted longitudinally and horizontally from their forward ends, so that their lower arms may be below, and their upper arms in a groove in the upper side of, the platform J, to which, above the said arms I, the seed-hoppers K are attached. In the upper arms of the bars I are formed holes, of such a size as to contain enough seed for a hill, and in such positions as to enter the hoppers K, to receive the seed as the bar H moves back, and to pass out of said hoppers, and over holes in the platform J, as the bar H moves forward. As the seed drops through the holes in the platform J it is received upon the lower arms of the bars I, and held until the bar H moves back, when it drops to the ground. The bar H is forced back, when released from the cams G, by the spring L, attached to the rear edge of the platform J, and which presses against the forward side of the bar H. The furrows are opened to receive the seed by the plows M, the standards of which are attached to the cross-bar or rock-shaft N, the ends of which work in bearings attached to the lower part of the frame C. The draft-strain upon the plows M is sustained by the chains O, the rear ends of which are attached to the standards of the said plows M, and their forward ends are attached to the forward cross-bar of the frame C. To the bar or shaft N is attached a short rigid arm, P, with which is connected the lower end of the lever Q. The lever Q passes up through a slot in the platform J, is pivoted to said platform, and its upper end projects into such a position that it may be conveniently reached and operated by the driver from his seat, so that by operating the lever Q the furrowing-plows can be raised from the ground when desired. R are the covering-plows, which are placed a little in the rear, and at one side of the plows M, so as to fill the furrows opened by said plows M, and cover the seed. The standards of the plows R are attached to a bar or shaft, S, the ends of which work in bearings attached to the frame C. The draft-strain upon the covering-plows R is sustained by the chains T, the rear ends of which are attached to the standards of the said plows R, and their forward ends are attached to the standards of the plows M, so that the covering-plows R may be raised from the ground with and by the said plows M. U are small V-shaped harrows, which are drawn in the rear of the covering-plows R by the chains V, the forward ends of which are attached to the bar or shaft S. The rear parts of the two harrows U are connected by a cross-bar, W, to keep them always in proper relative position. To the middle part of the cross-bar W is attached the branched rear end of a chain, X, which passes over a roller or pulley pivoted to a cross-bar of the frame C, and its forward end is attached to the lever Q, so that the same movement of the lever Q may raise all the plows and the harrows from the ground. To the axle B is attached a ratchet-wheel, Y, upon the teeth of which rest the engaging ends of the two pawls Z A'. The pawl Z is pivoted to a cross-bar of the frame C, and is designed to prevent the axle from being turned back by friction. The pawl A' is pivoted to a lever, B', which is pivoted to a short stud attached to a cross-bar of the frame C, so that by operating the lever B' the axle B may be turned by hand to adjust it with respect to the dropping device, and to the wheels, as may be required. C' is a lever, the lower end of which is pivoted to the platform J, and its upper end projects into such a position that it may be readily reached and operated by the driver from his seat. To the lever C' is pivoted the forward end of a rod or chain, D', the rear end of which is pivoted to the center of the sliding bar H, so that by operating the lever C', the dropping device can be operated by hand, or held from operating, as may be desired. E' are rollers, which revolve upon an axle or rod, F', the end parts of which are bent at right angles to form arms, or have arms attached to them, the ends of which are pivoted to the cross-bar W, attached to the rear ends of the harrows U, in such positions that the rollers E' may follow the rows, and press the rail down upon the seeds.

Having thus described my invention, I claim as new and desire to secure by Letters Patent—

1. The combination of the rings F and pivoted pawls E with the drive-wheels A and with the ratchet-wheels D, attached to the axle B, substantially as herein shown and described.

2. The combination of the harrows U, cross-bar W, rollers E' F', and chains V X with the rear rock-shaft S and the lever Q, substantially as herein shown and described.

3. The combination of the ratchet-wheel Y, pawls Z A', and lever B' with the axle B of the machine, substantially as herein shown and described.

JAMES WM. SIMPSON.

Witnesses:
W. C. JOHNSON,
E. HOGAN.